UNITED STATES PATENT OFFICE.

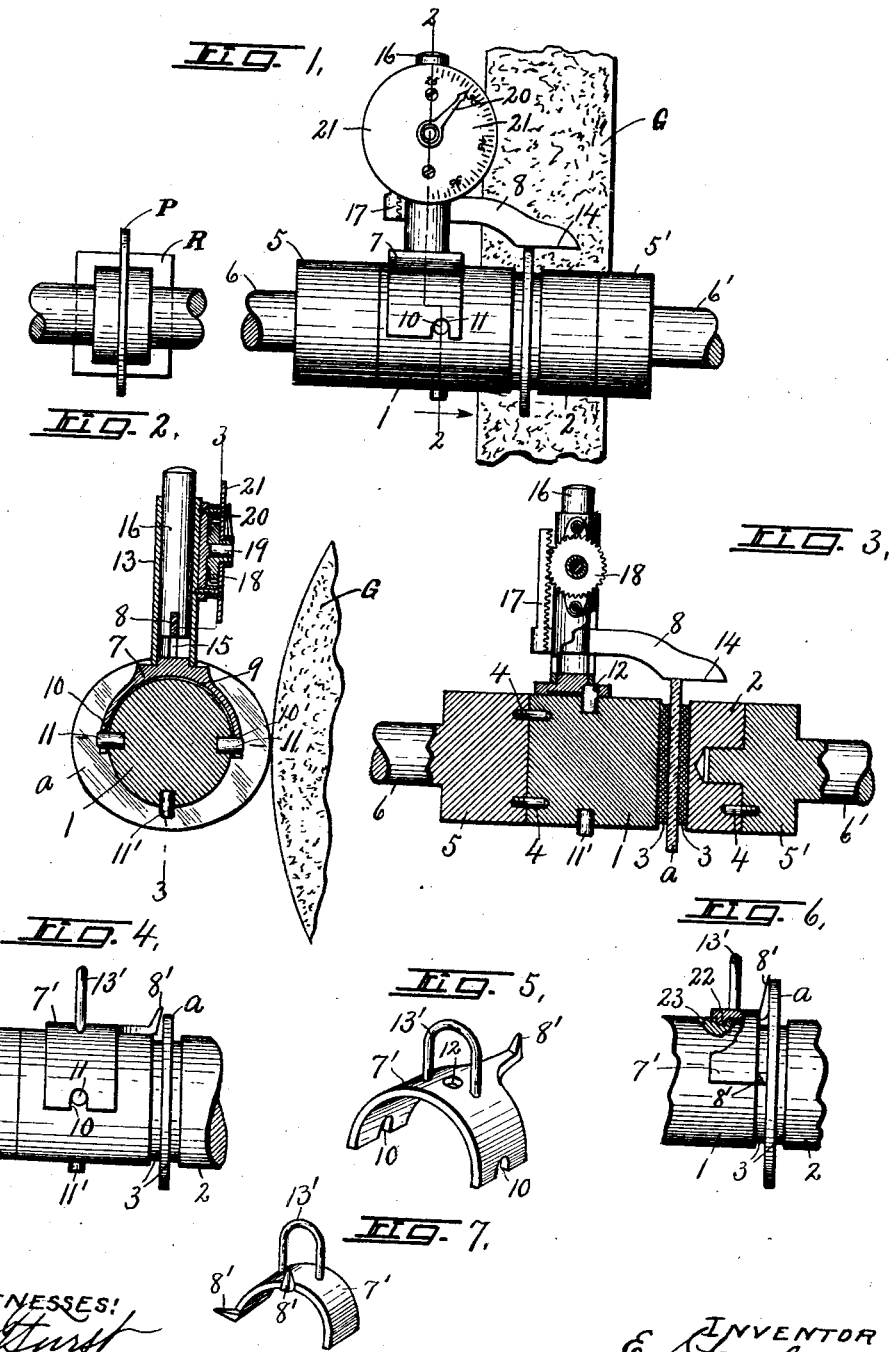

ERNEST STEAD, OF BINGHAMTON, NEW YORK.

DEVICE FOR POSITIONING AND MEASURING OPTICAL AXES OF LENSES IN EDGE-GRINDING MACHINES.

1,389,912. Specification of Letters Patent. Patented Sept. 6, 1921.

Application filed March 31, 1916. Serial No. 87,979.

*To all whom it may concern:*

Be it known that I, ERNEST STEAD, a citizen of the United States of America, and resident of Binghamton, in the county of Broome, in the State of New York, have invented new and useful Improvements in Devices for Positioning and Measuring Optical Axes of Lenses in Edge-Grinding Machines, of which the following, taken in connection with the accompanying drawings, is a full, clear, and exact description.

This invention relates to a device for testing the axes of lenses and is adapted to be used more particularly in connection with the lens-holders of edge-grinding machines in which the lens or lenses are rotated edgewise against the face of a rotary grinding element, the shape of the lens being usually determined by a coaxial pattern rotating with the lens and against a suitable backrest in a manner well known to those skilled in this art, and not necessary to herein illustrate or describe.

The axes of lenses to be ground are previously marked on the lenses near the edges thereof in a suitable centering and marking machine, after which the lens is placed between the coaxial clamping members of the rotary holder with its optical axes in the same radial planes as the corresponding axes of the pattern or form.

It is well known, however, that this operation of properly placing the lens in the holder is not only highly important, but also rather difficult, and one of the main objects of my present invention is to secure greater accuracy in positioning the lens in the holder relatively to a definite radial line or plane coincident with the corresponding axes of the pattern after the lens has been placed in the holder.

Another object is to utilize the same device for testing the lengths of the axes of the lenses.

In other words, I have sought to provide a more convenient, expeditious and reliable means for testing the accuracy of position of a lens in the holder, and also for measuring the lengths of the optical axes in one and the same operation.

Other objects and uses relating to specific parts of the device will be brought out in the following description.

In the drawings—

Figure 1 is a face view of a lens-holder for edge-grinding machines with one form of my invention applied thereto.

Fig. 2 is a sectional view taken on line 2—2, Fig. 1.

Fig. 3 is a longitudinal vertical sectional view of the same device taken in the plane of line 3—3, Fig. 2.

Fig. 4 is a face view of the same lens-holder and a modified form of axis-testing device.

Fig. 5 is a perspective view of the axis-tester shown in Fig. 4.

Fig. 6 is a face view of the lens-holder and a still further modified form of axis-tester having two feelers, portions thereof being shown in section.

Fig. 7 is a perspective view of the testing device shown in Fig. 6.

As illustrated, the lens-holder comprises co-axial cylindrical clamping members —1— and —2— having their adjacent ends provided with yielding face members —3— of leather or other suitable material for holding between them by frictional contact one or more lenses —a—, which may be adjusted rotarily by hand to bring their optical axes in proper position, the opposite ends of said clamping members being interlocked by pins —4— with the adjacent ends of rotary heads —5— and —5'— of separate shaft sections —6— and —6'—, either or both of which may be driven by any suitable power-transmitting mechanism from any available source of power, not necessary to herein illustrate or describe, except that one of the shaft sections, as —6'—, may be moved axially against the action of a suitable retracting spring, not shown, for opening and closing the clamping members from and upon the lens —a—, the pins —4— serving to cause the rotation of their respective clamping members —1— and —2— as the shafts —6— and —6'— are rotated.

The means illustrated in Figs. 1, 2 and 3 for testing the optical axes of a lens —a— in the holder,—that is for determining the proper position of said axes with relation to the corresponding axes of the pattern, as P, and also for determining the length of said axes comprises a supporting base or saddle —7— having a feeler —8— mounted thereon, the base —7— being provided with a substantially semi-cylindrical concave inner face or seat —9—, preferably of the same radius as that of the clamping member —1— of the holder upon which it is adapted to be mounted, the lower edges of the opposite sides of the base —7— being provided with recesses —10— adapted to fit upon the projecting ends of diametrically opposite pins or studs —11— projecting radially from the member —1— and coöperating with the lower edges of the opposite sides of the base —7— and recesses —10— for positioning and holding the feeler —8— in the radial plane of one of the axes of the pattern P, said feeler being in close proximity to the periphery of the lens —a— when the latter is clamped in the holder, thus permitting said lens to be adjusted to bring the corresponding axis into the same radial plane by registering the mark indicating such axis with said feeler.

The same device is used in connection with another pair of radially projecting pins —11'— arranged at right angles to the first-named pins —11— for determining the proper position of the lens in the holder which will cause the other axis to be brought in the same radial plane as the corresponding axis of the pattern —P—, which rides against a suitable back-rest —R—, the base —7— being provided with a central aperture —12— for receiving the adjacent pin of one set when the device is centered by the pins of the other set.

In the embodiment of my invention shown in Figs. 1 to 3, inclusive, the feeler —8— is movable radially along a radial guide —13— on the base —7— and preferably consists of a thin plate arranged edgewise vertically and projecting parallel with the axis of the holder some distance to one side of the guide —13—, the free end of said feeler being provided with an elongated contact edge —14— also running parallel with the axis of the holder and across the meeting faces of the clamping members —1— and —2— for engaging the periphery of the lens —a—, the contact edge —14— of the feeler being preferably brought to a knife edge so as to register more accurately with the axis mark on the lens.

One set of the pins, as —11—, is disposed in the same radial plane as one of the axes of the pattern —P—, the other set of pins being disposed in the same radial plane as the other axis of said pattern, and it, therefore, follows that when the base —7— is placed upon the holder in engagement with one set of pins, as —11—, corresponding to one axis of the pattern, the feeler —8— will be disposed in the same radial plane as that of the other axis of said pattern.

Now, if the corresponding axes of the lens and pattern are not in the same radial plane the mark on the lens indicating such axis will be at one side or the other of the contact edge —14—, thus indicating that the lens is not properly positioned, whereupon one of the clamping members may be loosened and the lens adjusted by hand until such axis mark is registered with the feeler.

When the lens is adjusted to bring one of its axis marks in registration with the feeler, the base —7— may be removed and the holder rotated a half turn more or less according to the convenience of manipulation, whereupon the base —7— may be replaced in engagement with the other set of pins, as —11'—, to determine whether or not the other axis mark is registered with the feeler —8—, and if not, the lens may be again adjusted to produce such registration.

As soon as it is found by these repeated operations that the axis marks are properly registered with the pointer, it indicates that the lens is positioned with its axes in the same relation as the corresponding axes of the pattern and that it is then ready for the grinding operation against a suitable grinding wheel —G—, a portion of which is shown in Figs. 1 and 2.

The contact edge —14— of the feeler is somewhat longer than the thickness of a single lens so as to engage the peripheries of a plurality of lenses when ground at the same time, and together with the radial movement of the feeler may be utilized to indicate the radial distance from the center to the periphery of any portion of the lens, or for indicating the lengths of the axes of such lens, and for this purpose one end of the feeler is guided in a radial slot —15— in the guide —13— which, in this instance, is tubular for receiving and guiding a plunger —16— to which the adjacent end of the feeler is secured, the plunger serving to prevent binding of the feeler in its radial movement, while the slot —15— serves to hold the free edge of the feeler in the same radial plane in all positions of adjustment.

The lengths of the axes of the lens may be indicated in terms of any denomination or unit of measurement, preferably in milimeters, and in order that these measurements may be determined at a glance the feeler —8— is provided with a radially extending toothed rack —17— meshing with a pinion —18— which is journaled on a stud or sleeve —19— projecting radially from one side of the tubular guide —13—, as shown more clearly in Fig. 2.

An index finger —20— is secured to the hub of the pinion —18— and is movable thereby around a suitable dial —21— graduated to indicate any diameter or length of axis of the lens, the weight of the plunger —16— and feeler —8— being sufficient to hold the feeler in contact with the periphery of the lens.

The modified forms of testing devices shown in Figs. 4, 5, 6 and 7 are used only for the purpose of properly positioning the lenses in the holder with their axes in the same radial line as the corresponding axes of the pattern, the device shown in Fig. 4 being provided with a single index finger or feeler —8'— rigidly secured to or integral with the base, as —7'—, while the device shown in Figs. 6 and 7 is provided with two of said feelers —8'— disposed in different radial lines at an angle of ninety (90°) degrees for testing both axes simultaneously.

Each of the feelers, —8'— preferably terminates in a radial extension lying close to the marked face of the lens when adjusted for use, each of the devices —7'— being provided with a suitable handle, as —13'—, by which it may be manipulated.

In the testing device shown in Figs. 6 and 7, the base may be held against circumferential or lateral movement on the lensholder by means of a single pin or stud —22— entering a corresponding socket —23— in the periphery of the holder.

Otherwise, the structure is very similar to that shown in Figs. 4 and 5.

What I claim is:—

1. The combination with a rotary lensholder and a lens-pattern in fixed relation to the holder and coaxial therewith, the lens being adjusted rotarily and radially in the holder to bring its optical axes into alinement with the corresponding axes of the pattern, of means for determining the angular position of the axes of the lens relatively to those of the pattern comprising a saddle resting on the periphery of the holder and provided with a feeler in proximity to the lens in the holder and alined with one of the optical axes of the lens pattern, and means for holding the saddle against turning relatively to the lens holder.

2. The combination with a rotary lensholder and a lens-pattern in fixed relation to the holder and coaxial therewith, the lens being adjustable rotarily and radially in the holder to bring its optical axes into alinement with the corresponding axes of the pattern, of means for determining the angular position of the axes of the lens relatively to those of the pattern comprising a saddle resting on the periphery of the holder, a feeler adjustable radially of and upon the saddle in the same radial plane as that of one of the optical axes of the pattern and provided with a contact face for engaging the periphery of a lens in the holder, and means for holding the saddle against turning relatively to the holder.

3. The combination with a rotary lensholder and a lens-pattern in fixed relation to the holder and coaxial therewith, the lens being adjustable rotarily and radially in the holder to bring its optical axes into alinement with the corresponding axes of the pattern, of means for determining the angular position of the axes of the lens relatively to those of the pattern comprising a saddle resting on the periphery of the holder, a feeler adjustable radially of and upon the saddle in the same radial plane as that of one of the optical axes of the pattern and provided with a contact face for engaging the periphery of a lens in the holder, means for holding the saddle against turning relatively to the holder and means on the saddle for indicating the amount of adjustment of the feeler from a certain position.

In witness whereof I have hereunto set my hand this 28th day of March, 1916.

ERNEST STEAD.

Witness:
H. E. CHASE.